United States Patent [19]

Dinkelmann et al.

[11] Patent Number: 4,853,566
[45] Date of Patent: Aug. 1, 1989

[54] APPARATUS FOR VENTILATING AN ELECTRIC MOTOR FOR TEXTILE SPINNING MILL MACHINES

[75] Inventors: Friedrich Dinkelmann, Rechberghausen; Horst Wolf, Albershausen, both of Fed. Rep. of Germany

[73] Assignee: Zinser Textilemaschinen GmbH, Fed. Rep. of Germany

[21] Appl. No.: 130,087

[22] Filed: Dec. 8, 1987

[30] Foreign Application Priority Data

Dec. 9, 1986 [DE] Fed. Rep. of Germany ....... 3642038

[51] Int. Cl.⁴ .............................................. H02K 9/00
[52] U.S. Cl. ....................................... 310/59; 310/62; 310/63; 310/88; 310/89; 310/91; 57/100; 57/308
[58] Field of Search ...................... 310/62, 52, 63, 53, 310/91, 60 R, 157.58, 88.59, 89; 57/308, 100, 104, 105

[56] References Cited

U.S. PATENT DOCUMENTS

| | | | |
|---|---|---|---|
| 2,778,958 | 1/1957 | Hamm et al. | 310/63 |
| 3,041,117 | 6/1962 | Ramsey | 310/88 |
| 3,512,024 | 5/1970 | Papa | 310/88 |
| 4,679,389 | 7/1987 | Wolf | 57/308 |
| 4,742,257 | 5/1988 | Carpenter | 310/62 |

FOREIGN PATENT DOCUMENTS

| | | | |
|---|---|---|---|
| 1682885 | 6/1953 | Fed. Rep. of Germany . | |
| 1121197 | 1/1962 | Fed. Rep. of Germany | 310/88 |
| 2411532 | 11/1977 | Fed. Rep. of Germany . | |
| 2825454 | 12/1978 | Fed. Rep. of Germany | 310/88 |
| 3136775 | 3/1983 | Fed. Rep. of Germany . | |
| 0930503 | 5/1982 | U.S.S.R. | 310/63 |

*Primary Examiner*—R. Skudy
*Attorney, Agent, or Firm*—Shefte, Pinckney & Sawyer

[57] ABSTRACT

In a self-ventilated electric motor such as utilized in a textile spinning mill machine, a fan cowling and cover plate are arranged to define a ventilating air flow pathway by respective support members which are disposed entirely outside the pathway to prevent accumulation of lint and debris on the support members.

6 Claims, 1 Drawing Sheet

1

APPARATUS FOR VENTILATING AN ELECTRIC MOTOR FOR TEXTILE SPINNING MILL MACHINES

BACKGROUND OF THE INVENTION

The present invention relates to an apparatus for ventilating an electric motor utilized in a textile spinning mill machine and, particularly, to such an apparatus for self-ventilating the electric motor by means of a fan wheel mounted on the motor shaft in conjunction with a fan cowling for deflecting a ventilating current of air along the exterior of the electric motor.

In self-ventilated electric motors of the aforementioned type, it is known to secure the fan cowling to the housing of the electric motor by intermediate supporting cross members extending between the motor housing and the fan cowling. When using a self-ventilated electric motor of this type in a textile spinning mill machine, airborne lint, debris and the like tend to accumulate on the cross members since they are located in the direct pathway of the ventilating air flow. Disadvantageously, the accumulated lint and debris may impair the effective cooling of the electric motor and further may represent a fire hazard. Moreover, the accumulated lint and debris occasionally will separate from the supporting cross members which can cause contamination of the motor or the associated spinning mill machine resulting in potential operating problems.

SUMMARY OF THE INVENTION

It is accordingly an object of the present invention to provide an improved apparatus for self-ventilating an electric motor, particularly for motors utilized in textile spinning mill machines, to minimize accumulations of airborne lint and debris.

The foregoing objective is satisfied in the present invention by the provision of a support means for the fan cowling which is arranged entirely outside the deflection pathway for ventilating airflow defined by the cowling, so as to restrict accumulation of airborne lint and debris on the support means. In this manner, the cooling of the electric motor by the ventilating airflow is essentially unimpeded by lint and debris accumulations and in turn significantly reduces the risk of contamination of the electric motor.

In the preferred embodiment of the present invention, a cover plate is disposed by respective support means in spaced parallel relation with the cowling to protectively cover its air intake opening and prevent unintended contact with the fan wheel. The cover plate defines with the cowling an air intake pathway to the air intake opening, with the cover plate support means being arranged outside the air intake pathway to restrict accumulation of airborne lint and debris on the cover plate support means. Preferably, the cover plate is of a dimension greater than the dimension of the air intake opening.

The textile spinning mill machine preferably includes a machine frame within which the electric motor is housed. In the preferred embodiment of the present invention, each of the cowling support means and the cover plate support means respectively comprise support members extending between their respective surfaces outwardly from the ventilating air flow pathway and the machine frame.

DESCRIPTION OF THE PREFERRED EMBODIMENT

Figure 1:
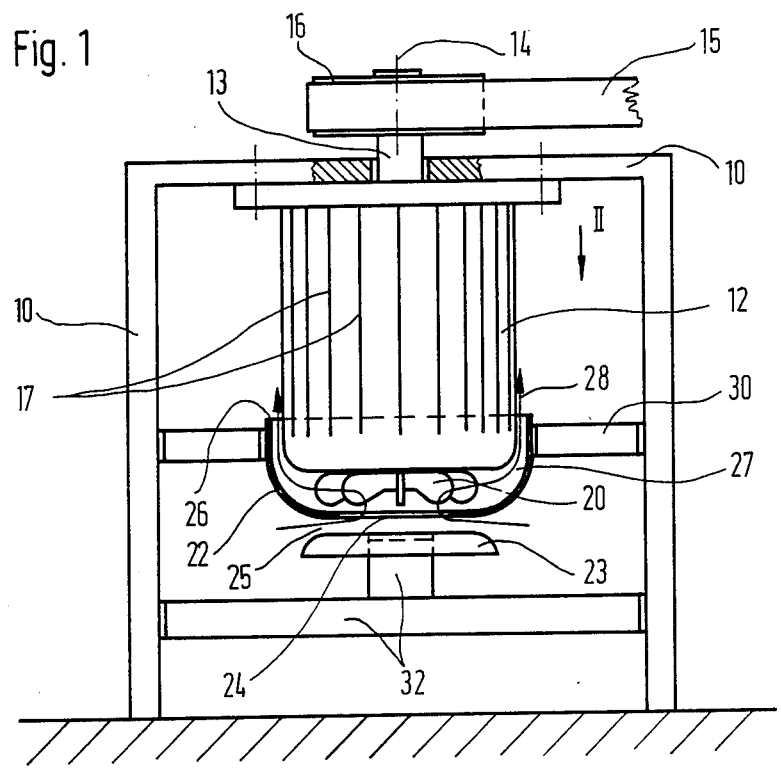
FIG. 1 is a side elevational view of a self-ventilated electric motor according to the preferred embodiment of the present invention, with the fan cowling being shown in vertical cross-section.
Figure 2:
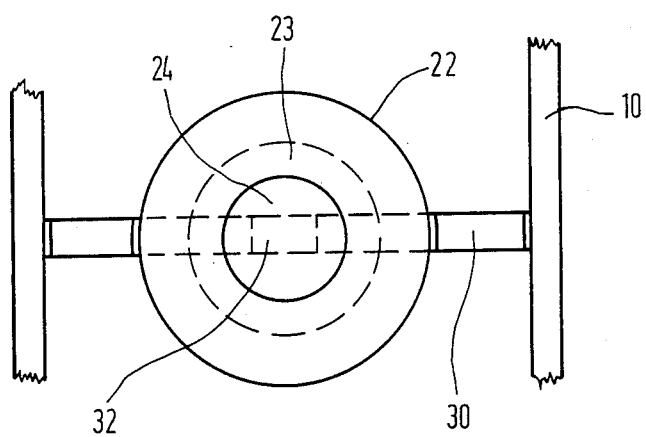
FIG. 2 is a top plan view of the fan cowling and the cover plate of FIG. 1 as viewed from the arrow II shown therein.

Referring now to the accompanying drawings and initially to FIG. 1, an electric motor 12 is shown as typically suspended in axially vertical disposition from a horizontal support member of a machine frame representatively indicated at 10, such as the frame of an associated textile spinning mill machine (not shown). In conventional fashion, the electric motor 12 may be fastened to the machine frame by any suitable manner, such as by screws, bolts or like fasteners. The electric motor 12 has an output drive shaft 13 which extends vertically upwardly from the machine frame 10 for driving rotation about a vertical axis of rotation 14. A drive pulley 16 is affixed to the projecting upward end of the drive shaft 13 and a drive belt 15 is trained about the drive pulley 16. As will be understood, in a typical textile spinning machine having a plurality of longitudinally arranged spinning stations (not shown), the drive belt 15 extends along the length of the spinning machine in driving relationship to the spindles of the individual spinning stations. The electric motor 12 includes a plurality of cooling fins 17 arranged about the outer periphery of the motor 12.

The lower depending end of the motor drive shaft 13 has a fan wheel 20 affixed thereto, the fan wheel 20 preferably being of a conventional paddle-type radial fan wheel. The diameter of the fan wheel 20 is smaller than the outside diameter of the electric motor 12.

A bowl-shaped fan cowling 22 is disposed at the lower end of the electric motor 12 to substantially surround the fan wheel 20 with the rim of the cowling 22 extending upwardly about the housing of the electric motor 12 to define therebetween an annular air exhaust opening 26. An air intake opening 24 is formed centrally in the lower area of the fan cowling 22 generally in axial alignment with the fan wheel 20. In this manner, the cowling 22 defines a ventilating air flow pathway 27 extending between the cowling 22 and the electric motor 12 symmetrically about its axis of rotation 14 from the intake opening 24 in the cowling 22 upwardly to and through the exhaust opening 26. In this disposition, the cowling 22 serves to deflect upwardly the radially outwardly directed ventilating air current generated by the radial fan wheel 20, as indicated by the arrow 28, to direct the air flow 28 through the discharge opening 26 to flow axially along the outside of the electric motor 12 for contacting the cooling fins 17 thereof.

The fan cowling 22 is mounted in its described disposition on the machine frame 10 by a plurality of supporting cross members 30 affixed to the exterior surface of the fan cowling 22 outside the ventilating air flow pathway 27 and extending horizontally therefrom to the machine frame 10. Thus, the supporting cross members 30 are disposed to be entirely out of contact by the ventilating air flow 28 and, as a result, the ventilating air flow pathway 27 is entirely free of support members or other structural components on which airborne lint and debris may accumulate as a result of contact with the ventilating air flow 28.

A cover plate 23 is arranged in spaced, substantially parallel, facing relationship with the downwardly-facing portion of the fan cowling 22 to be substantially coaxial with the intake opening 24 and with the axis of rotation 14 of the electric motor 12. The cover plate 23 has a surface area which is larger than that of the intake opening 24 in the fan cowling 22. Thus, the cover plate 23 provides protection against accidental or unintended contact with the fan wheel 20. Further, the spacing between the cover plate 23 and the fan cowling 22 defines an annular air intake pathway 25 through which ventilating air is drawn into and through the intake opening 24 in the fan cowling 22.

The cover plate 23 is mounted in its described disposition on the machine frame 10 by means of supporting cross members 32 extending from the machine frame 10 and mounted to the underside of the cover plate 23 opposite the fan cowling 22 to be outside the intake flow of ventilating air through the intake pathway 25.

Accordingly, it will be understood that the entire pathway of the ventilating air flow 28 through the annular intake pathway 25, through the intake opening 24 in the fan cowling 22, upwardly through the ventilating air flow pathway 27 and outwardly through the annular exhaust opening 28, is completely devoid of any supporting members for the cowling 22 and cover plate 23, and any other structural components on which airborne lint, debris and the like could settle and accumulate.

Those persons skilled in the art will readily understand that the fan cowling 22 and the cover plate 23 may be provided, as desired, with a common support structure and thereby mounted on the machine frame. It is further possible to mount the fan cowling and/or the cover plate 23, either individually or together, directly on the adjacent floor surface. Additionally, the fan cowling and/or the cover plate 23 may be mounted on the electric motor, but in this case the supporting members must be spaced a sufficient distance from the intake pathway 25 and the discharge opening 26 so as to be subjected to a sufficiently low velocity of the ventilating air flow to avoid risk of settlement of airborne lint and debris on the support members.

It will therefore be readily understood by those persons skilled in the art that the present invention is susceptible of a broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiment, adaptations, variations, modifications and equivalent arrangements, the present invention being limited only by the claims appended hereto and the equivalents thereof.

We claim:

1. Apparatus for ventilating an electric motor, comprising a fan wheel operatively driven by said electric motor for producing a ventilating air flow, a cowling for substantially surrounding said fan wheel and said electric motor, said cowling having an air intake opening therein and said cowling being configured for defining a deflection pathway between said cowling and said electric motor for directing said ventilating air flow along the exterior of said electric motor, and support means for said cowling mounted exteriorly thereto outside said deflection pathway defined thereby without any support means for said cowling within said deflection pathway, to restrict accumulation of airborne lint and debris on said support means, said support means extending between said cawling and a machine frame.

2. Apparatus for ventilating an electric motor according to claim 1 and characterized further by a cover plate for disposition in protective covering relation to said air intake opening of said cowling to prevent unintended contact with said fan wheel and for defining with said cowling an air intake pathway to said air intake opening, and support means for said cover plate arranged outside said air intake pathway to restrict accumulation of airborne lint and debris on said cover plate support means.

3. Apparatus for ventilating an electric motor according to claim 2 and characterized further in that said cover plate is arranged in spaced parallel relation with said air intake opening of said cowling and is of a dimension greater than the dimension of said air intake opening.

4. Apparatus for ventilating an electric motor according to claim 1 and characterized further in that said cowling support means comprises at least one support member mounted to and supporting the surface of said cowling outwardly from said deflection pathway.

5. Apparatus for ventilating an electric motor according to claim 2 and characterized further in that said cover plate support means comprises at least one support members mounted to and supporting the surface of said cover plate outwardly from said air intake pathway.

6. Apparatus for ventilating an electric motor according to claim 6 and characterized further by a machine frame housing said electric motor, said support member extending between said cover plate and said machine frame.

* * * * *